United States Patent [19]

Sandvick

[11] Patent Number: 4,613,646

[45] Date of Patent: Sep. 23, 1986

[54] CLEANING AND POLISHING COMPOSITIONS

[75] Inventor: Paul E. Sandvick, Racine County, Wis.

[73] Assignee: S. C. Johnson & Son, Inc., Racine, Wis.

[21] Appl. No.: 723,021

[22] Filed: Apr. 15, 1985

[51] Int. Cl.$^4$ ............................................. C08K 5/01
[52] U.S. Cl. ................................. 524/476; 524/506; 524/517; 524/549; 525/103; 525/106; 526/271; 526/272
[58] Field of Search ............... 524/476, 549, 506, 517; 525/103, 106; 526/271, 272

[56] References Cited

U.S. PATENT DOCUMENTS

| | | | |
|---|---|---|---|
| Re. 28,475 | 7/1975 | Blecke et al. | 526/203 |
| 3,380,944 | 4/1968 | Kay et al. | 524/549 |
| 3,488,311 | 1/1970 | Burdick et al. | 524/549 |
| 3,553,177 | 1/1971 | Hazen et al. | 526/208 |
| 3,560,455 | 2/1971 | Hazen et al. | 524/549 |
| 3,560,456 | 2/1971 | Hazen et al. | 524/549 |
| 3,560,457 | 2/1971 | Hazen et al. | 524/549 |
| 3,598,778 | 8/1971 | Burdick et al. | 524/549 |
| 3,723,375 | 3/1973 | Field et al. | 524/549 |
| 3,929,492 | 12/1975 | Chapman et al. | 106/3 |
| 3,933,511 | 1/1976 | Heintzelman et al. | 106/10 |
| 3,933,512 | 1/1976 | Heintzelman et al. | 106/22 |
| 4,113,677 | 9/1978 | Svedas et al. | 524/506 |
| 4,163,645 | 8/1979 | Cheng et al. | 526/272 |
| 4,163,673 | 8/1979 | Dechert et al. | 524/488 |
| 4,354,871 | 10/1982 | Sutton | 106/3 |
| 4,358,573 | 11/1982 | Verbrugge | 526/272 |

*Primary Examiner*—Joseph L. Schofer
*Assistant Examiner*—J. M. Reddick

[57] ABSTRACT

A surface-treating water-in-oil emulsion composition, which is essentially wax-free, comprising water, hydrocarbon solvent, film-former, nonionic emulsifier and an alpha-olefin/maleic anhydride polymer.

18 Claims, No Drawings

CLEANING AND POLISHING COMPOSITIONS

FIELD OF THE INVENTION

This invention relates to surface-treating compositions for household items such as furniture. More particularly, this invention relates to cleaner-polishes which are essentially wax-free, water-in-oil emulsions.

DESCRIPTION OF THE PRIOR ART

Various compositions are known for cleaning and polishing of household items such as furniture, countertops and appliances. These compositions are prepared and used in various forms including pastes, solutions, lotions, creams and emulsions. In recent years water-in-oil emulsion polishes have become popular primarily because of their ease of application, particularly from aerosol containers. Contemporary water-in-oil emulsion polishes are typically comprised of water, organic solvents, film-formers and emulsifiers. Both the water and solvents act as cleaners to remove water-borne and oil-borne deposits from the surface. The film formers provide a protective layer and shine to the surface and may be either based on a non-drying oil or a silicone fluid with minor amounts of wax. Emulsifiers used to produce the conventional water-in-oil emulsion are either anionic, cationic or nonionic. Cationic emulsifiers have been said to be especially useful in formulating polishes as shown by U.S. Pat. No. 4,163,673.

Optional ingredients in water-in-oil emulsion polishes typically include minor amounts of preservatives and fragrances to provide improved stability and impart a desirable odor. One particularily advantageous optional ingredient in cleaner-polishes is a class of short-chain alpha-olefin, as described in U.S. Pat. No. 4,354,871. These materials provide enhanced cleaning and levelling characteristics to cleaner-polishes. Propellants, of course, are a required ingredient when the composition is to be applied from an aerosol container; and in some formulations the propellant may also serve to replace the organic solvent, as shown in U.S. Pat. No. 3,929,492.

While water-in-oil emulsion cleaner-polishes have achieved commercial popularity, several problems have been encountered in their use. One particular shortcoming of emulsion polishes has been that the films which are formed on a surface tend to deteriorate over time, pulling back into themselves to reduce surface exposure. This migration of the film causes dull, hazy patches to form giving a mottled, blotchy appearance to the surface. With continued deterioration of the integrity of the film, the dull patches expand until the surface shine entirely disappears. The film may even migrate far enough to leave portions of the treated surface exposed.

The use of waxes in cleaner-polishes containing silicone film-formers has helped to retard the mottling problem by anchoring the film more firmly to the treated surface. However mottling nevertheless occurs and the surface may become unsightly in its nonuniform shine even as soon as 24 hours after application.

Further, waxes do not satisfactorily inhibit mottling in films formed from non-drying oil-containing (e.g. mineral oil) cleaner-polishes. And films from non-drying oil-containing polishes generally deteriorate quicker than films from silicone polishes.

It is, therefore, an object of the present invention to provide novel surface-treating compositions characterized by the improved inhibition to mottling and blotchiness in the films formed therefrom.

A further object of this invention is to provide a silicone-containing cleaner-polish which does not have the traditional mottling problem associated with silicone and wax-containing cleaner-polishes.

Another object of this invention is to provide an essentially wax-free, silcone-containing cleaner-polish by substituting alpha-olefin/maleic anhydride polymers for all or part of the wax component traditionally used in silicone-containing cleaner-polishes.

Yet another object of this invention is to provide a silicone-containing cleaner-polish, produced by a cold-blending process, that has superior performance properties.

Still another object of this invention is to provide a non-drying oil-containing cleaner-polish having improved film integrity characteristics.

Other objects of the present invention are set forth in, or will be apparent from, the following description of the invention.

SUMMARY OF THE INVENTION

The surface-treating compositions of the present invention are comprised of an alpha-olefin/maleic anhydride polymer; nonionic emulsifier; water; organic solvent; and film former. These components are present in the composition in amounts sufficient to provide performance characteristics of high gloss, reduced mottling tendencies and good cleaning.

The compositions are essentially wax-free with the alpha-olefin/maleic anhydride polymer substituting for the traditional wax component. The alpha-olefin/maleic anhydride polymer imparts greater integrity to the film formed from the composition. Thus, films formed from the cleaner-polishes of the invention have reduced tendencies to become mottled and provide household surfaces with a long-lasting uniform shine.

The compositions of the present invention are water-in-oil emulsions, or "oil-out" emulsions. The emulsions can be applied from an aerosol system containing an appropriate propellant, or they may be applied as a liquid with a polishing cloth, or by other suitable means onto the surface to be treated.

DETAILED DESCRIPTION OF THE INVENTION

The present invention embraces both silicone- and non-drying oil-containing water-in-oil emulsions as surface treating compositions of the type used to clean and polish household surfaces. Each composition is comprised of the essential components water, organic solvent, film-former, nonionic emulsifier and alpha-olefin/maleic anhydride polymer.

The alpha-olefin/maleic anhydride polymers which are used according to the present invention are polymers selected from the group consisting of polymer of maleic anhydride and at least one 1-alkene having about 12–30 carbon atoms, and polymers of maleic anhydride, at least one lower 1-alkene and at least one higher 1-alkene. Preferably, the polymers are comprised of from about 49 to 60 mole percent of maleic anhydride and from about 40 to 51 mole percent of 1-alkene. For those polymers containing both higher 1-alkene and lower 1-alkene, the monomer content preferably is from about 49 to 60 mole % maleic anhydride, from about 10 to 40 mole % of at least one lower 1-alkene, and 10 to 40 mole % of at least one higher 1-alkene having more than 18 carbon atoms. These polymers are described in U.S. Pat. No. 4,358,573 which patent is expressly incorporated by reference for its disclosure of suitable alpha-olefin/maleic anhydride polymers.

The anhydride included in the alpha-olefin/maleic anhydride polymers is most preferably maleic anhydride. However, other maleic anhydrides can be utilized in the formation of the polymers such as methylmaleic anhydride, dimethylmaleic anhydride, fluoromaleic anhydride, methylethyl maleic anhydride and the like. Accordingly, as employed herein the term "maleic anhydride" includes such anhydrides in whole or in part. It is preferred that the anhydride be substantially free of acid and the like before polymerization.

The lower 1-alkenes suitable in the formation of the polymers have from 4 to 18 carbon atoms and include the following:
1-butene
1-pentene
1-hexene
1-heptene
1-octene
1-nonene
1-decene
1-dodecene
1-tetradecene
1-hexadecene
1-heptadecene
1-octadecene
2-methyl-1-butene
3,3-dimethyl-1-pentene
2-methyl-1-heptene
4,4-dimethyl-1-heptene
3,3-dimethyl-1-hexene
4-methyl-1-pentene
and the like. Mixtures of the above materials can be utilized. It is preferred to utilize straight chain 1-alkenes having from 8 to 18 carbon atoms, and accordingly, 1-octene, 1-nonene, 1-decene, 1-dodecene, 1-tetradecene, 1-hexadecene, 1-heptadecene, 1-octadecene, and mixtures thereof are preferred. These materials should be substantially free of diolefin as an impurity which causes gel formation and crosslinking. However, small amounts, i.e. less than 2 percent, can be present without causing undue gel formation and crosslinking in the resulting polymers. Also as noted above, either single materials, i.e. 1-octene, 1-decene, etc., can be used, or mixtures of these materials may be utilized.

The higher 1-alkenes utilized in the formation of the polymers have more than 18 carbon atoms. The alpha-olefins may be pure materials or may be mixtures of various higher 1-alkenes such as mixed $C_{20}$, $C_{22}$ and $C_{24}$ 1-alkenes and the like. Suitable alpha-olefins include the following:
1-eicosene
1-docosene
1-tetracosene
1-hexacosene
1-octacosene
1-triacontene
1-dotriacontene
1-tetratriacontene
1-hexatriacontene
1-octatriacontene
1-tetracontene
1-dotetracontene
1-tetratetracontene
1-hexatetracontene
1-octatetracontene
1-pentacontene
1-hexacontene
and mixtures thereof. Both pure alkenes and mixed alkenes can be utilized. Typical mixtures of $C_{30+}$ 1-alkenes are described in U.S. Pat. No. 3,553,177. Typically, these mixed higher alkenes are primarily even chain alpha-olefins. As with the lower 1-alkenes, the higher 1-alkenes should be free essentially of diolefins as impurities. Although small amounts of diolefins, typically less than 2 percent, can be tolerated as impurity in the higher 1-alkene monomer, it is preferred that the level of unsaturates in the monomer be kept to a minimum generally less than 1 percent and preferably less than 0.3 percent, to minimize undue crosslinking and insolubilization of the resulting polymer.

The preferred higher 1-alkenes are $C_{20}$–$C_{24}$ mixtures, $C_{24}$–$C_{28}$ mixtures, and $C_{30+}$ mixtures.

For those alpha olefin/maleic anhydride polymers formed from maleic anhydride and at least one 1-alkene having 12 or more carbon atoms, the 1-alkene can be either a pure 1-alkene or mixtures of these materials.

The preferred alpha olefin/maleic anhydride polymers are polymers of maleic anhydride, a higher 1-alkene and a lower 1-alkene.

Each of the above three monomers must be present in the preferred alpha-olefin/maleic anhydride polymers in certain specific amounts in order to achieve the desired result. In other words, if too much higher 1-alkene is included the polymer is not sufficiently soluble while if sufficient higher 1-alkene is not included, the film is not sufficiently anchored.

The polymers also may include minor portions of other modifying monomers. These monomers should be present in small quantities generally less than 3 mole percent. The purpose of these monomers is to modify one or more properties of the resulting polymer. Suitable modifying monomers include crosslinking agents such as divinylbenzene and the like.

As is well known in the art, polymers including maleic anhydride are essentially alternating polymers with maleic anhydride alternating between random comonomers. The alternating backbone occurs without regard to the relative ratio of the reactants. This phenomenon is described in various patents noted below relating to the process of preparing the polymers. Accordingly, the alpha-olefin/maleic anhydride polymers will contain from about 49 to 60 mole percent of maleic anhydride. Under some conditions such as very high initiator levels, it is possible to include some small excess of maleic anhydride relative to the comonomers in these polymers. The amount of 1-alkene will vary from about 51 to 40 mole %. For the preferred polymers, the amount of lower 1-alkene monomer present in the polymers is from about 10 to 40 mole percent while the amount of higher 1-alkene is similarly from about 10 to 40 mole percent. The most preferred polymers include from 49 to 55 mole percent maleic anhydride and from about 10 to 30 mole percent lower 1-alkene monomer and from about 10 to 40 mole percent higher 1-alkene. The optimum alpha-olefin/maleic anhydride polymers include about 50 mole percent maleic anhydride, about 10 mole percent lower 1-alkene and about 40 mole percent higher 1-alkene.

The alpha-olefin/maleic anhydride polymers may be prepared by any of a number of conventional polymerization processes including polymerization processes as set forth in U.S. Pat. No. Re. 28,475, U.S. Pat. Nos.

3,553,177, 3,560,455, 3,560,456, 3,560,457, 3,488,311 and 4,358,573.

The polymers are generally low molecular weight materials having a number average molecular weight within the range of from 3,000 to 15,000 and preferably within the range of from 3,000 to 10,000.

The alpha-olefin/maleic anhydride polymers are used as substitutes for all or part of the wax-components that have traditionally been utilized in silicone-containing emulsion polishes. This substitution has been found to increase the integrity of films formed from the polishes with the film being "anchored" more securely to the surface than films from conventional polishes having a substantial wax content. The use of the alpha-olefin/-maleic anhydride polymers in non-drying oil-containing polishes also has been found to retard the deterioration of the formed films. Consequently, application of the cleaner-polish compositions of the present invention provide surfaces with a longer-lasting, uniform shine.

The alpha-olefin/maleic anhydride polymers are included in the compositions of this invention in amounts of from about 0.05 to about 5 percent by weight of the total composition (excluding any propellants) when the compositions contain silicone. Preferably, silicone-containing compositions should contain from about 0.1 to about 1 weight percent alpha-olefin/maleic anhydride polymer; more preferably, from about 0.2 to about 0.4 weight percent. For those compositions not containing a silicone, more polymer is needed to help form an acceptable film. Therefore, such compositions include from about 0.1 to about 8 percent polymer by weight of the total composition (again, excluding any propellants). Preferably, non-drying oil-containing compositions should contain from about 0.3 to about 3 weight percent alpha-olefin/maleic anhydride polymer; more preferably, from about 0.5 to about 2 weight percent.

Nonionic emulsifiers suitable for use in the present invention include sorbitan esters of oleic, stearic, isostearic, palmitic, and lauric acids; polyethoxylated sorbitan esters having up to 20 ethoxy units; the mono- and di-glycerides of fat-forming fatty acids; and combinations thereof. Generally, nonionic emulsifiers having low HLB (hydrophilic/lipophilic balance) values are employed, though small amounts of emulsifiers having high HLB values may be used in combination with low HLB valued nonionic emulsifiers. Exemplary nonionic emulsifiers are Span and Tween emulsifiers available from ICI Americas, Inc.; and Monamid emulsifiers available from Mona Industries, Inc. The nonionic emulsifiers are present in an amount from about 0.2 to about 5 weight percent based on the total weight of the composition (exclusive of any propellants). Preferably, the nonionic emulsifier is present in an amount from about 0.6 to about 1.5 weight percent.

The organic solvents useful in accordance with the present invention are naphtha and those hydrocarbon solvents conventionally employed in household cleaner-polishes. Suitable hydrocarbon solvents have a kauri-butanol value of from about 20 to about 50, and have boiling ranges which lie within the range of about 60° to 210° C., and preferably lie within the range of 95° to 150° C. Isoparaffinic hydrocarbon solvents such as those commerically available from Exxon Corporation under the tradename Isopar, and the Soltrols commercially available from Phillips Petroleum Corporation are preferred because they are substantially odor-free. Other suitable solvents include hexane, heptane, Stoddard solvents, etc. The naphtha or hydrocarbon solvent is present in the range of from about 5 to about 70 percent by weight based on the total weight of the composition (excluding any propellants). Preferably, however, the solvents will be present in an amount of from about 5 to about 35 weight percent in a silicone-containing composition, and in the amount of from about 5 to about 25 weight percent in a non-drying oil-containing composition.

Suitable non-wax film-formers useful in accordance with the present invention are those film-formers conventionally employed in water-in-oil emulsion cleaner-polish compositions and include the organic polysiloxanes and non-drying oils. Preferred film formers for the compositions are the organic polysiloxanes including polydialkyl siloxane, polyalkylaryl siloxane, and polydiaryl siloxane. Polysiloxanes such as polydimethyl siloxane, polydiethyl siloxane, polymethyethyl siloxane, polymethylphenyl siloxane, and copolymers of two or more of such siloxanes are exemplary of the materials which can be used. Polydimethyl siloxane is especially preferred, particularly combinations of polydimethyl siloxanes having different viscosities ranging from about 5 to 50,000 centistokes, and preferably at from about 100 to 10,000 centistokes.

In addition to the silicones, non-drying oils can be used as the film-former either alone or in combination with the silicones. Examples of suitable non-drying oils include heavy and light mineral oils commercially available under the tradenames Marcol or Primol from the Exxon Corporation.

The film formers are present in an amount of from about 0.5 to about 30 percent based on the total weight of the composition (exclusive of any propellants). In silicone-containing compositions, silicone should be present preferably in an amount from about 1 to about 8 weight percent. Non-drying oil-containing compositions preferably contain from about 8 to about 25 weight percent non-drying oil.

Water is the principal constituent of the dispersed phase in the emulsion. The water serves to clean waterborne stains from the surface being treated. Generally, water makes up the balance of the composition, being present in an amount of from about 40 to about 85 percent. In addition to the aforesaid ingredients, minor amounts of preservatives and fragrance can be utilized in the compositions to provide improved stability to the compositions and to impart a desirable odor. Preservatives such as formaldehyde and the quaternary materials are commonly employed in cleaner-polishing compositions.

Another optional, but preferred component of the cleaner-polish compositions of the present invention is a low molecular weight oily material often identified and used as a dielectric oil. These oily materials are referred to herein as "coupling oils". These are non-reactive (with the furniture polish ingredients) oils which are soluble in the film-forming silicone compositions and non-drying oils, and which also aid in solubilizing the alpha-olefin/maleic anhydride polymers. Suitable coupling oils for use in the cleaner-polishes of this invention include the various branched alkyl benzenes, polybutene, and mixtures of branched alkyl benzene with polybutene. Preferred coupling oils for silicone containing compositions are mixtures of a branched alkyl benzene with polybutene such as Dichevrol 500 available from Chevron. Dichevrol 500 is a blend of 25% polybutene (molecular weight 950) and 75% of a branched alkylbenzene having 15 carbon atoms or more. Preferred coupling oils for non-drying oil containing compositions are polybutenes of about molecular weight 950 to 2700 such as polybutene 128 (molecular weight 2700) available from Chevron. The coupling oil, when used in the compositions of the present invention, should be present in the amount of from about 0.05 to about 5 weight precent, preferably in amount of from 0.1 to about 2 weight percent. The most preferred compositions made in accordance with this invention include a blend of $C_{15+}$ branched alkylbenzenes and polybutene in an amount of from about 0.2 to 0.8 weight percent, or a polybutene in an amount of from about 0.4 to 1.4 weight percent.

The most preferred compositions of this invention are totally wax-free. However, it may be desirable to use a small amount of wax in some formulations. Waxes which are suitable include the synthetic waxes such as the microcrystalline waxes and petroleum waxes, or the natural waxes such as candelilla and carnauba waxes. From about 0.1 to about 2.5 weight percent wax may be employed in the compositions.

Conventional techniques for forming water-in-oil emulsion polishes may be used to produce the compositions of the present invention. The cleaner-polishes which are wax-free are preferably prepared by using a cold-blend process. One acceptable cold-blend process is to charge the oil phase ingredients (organic solvents, film-formers, emulsifiers, fragrances, and a pre-made solution of an alpha olefin/maleic anhydride polymer in organic solvent) into a vessel and mix until a homogeneous blend is achieved. (The pre-made organic solvent solution of alpha olefin/maleic anhydride polymer is preferably prepared by heating the polymer/solvent mixture until the polymer has dissolved, and then allowing the resulting solution to cool to ambient temperature. The solvent portion of the polymer solution is an organic solvent useful in accordance with the present invention such as naphtha and those hydrocarbon solvents conventionally employed in household cleaner-polishes. Water and any water phase ingredients (e.g., preservatives) are slowly added to the vessel with moderate agitation. The resulting composition is then optionally, but preferably, homogenized (e.g., by passage through a 3/64 inch diameter orifice at a 60–80 psig pressure drop across the orifice). When wax is a component of the cleaner-polish, it is added with the initial oil-phase ingredients and the mixture is heated to melt the wax and achieve a homogeneous mixture. After the addition of water and any other ingredients, the composition is adjusted to ambient temperature and then homogenized.

The water-in-oil emulsion compositions can be packaged in bottles or cans, or other containers at ambient pressure for application with polishing cloths or the like. Alternatively, the emulsion compositions can be charged to an aerosol-type pressure package with a suitable propellant. Pressure packaging of the cleaner-polish composition can be accomplished, for example, by charging aerosol cans using standard aerosol charging techniques with from 5 to 30 percent by weight of hydrocarbon liquid propellants such as propane, butane, isobutane, LPG, and mixtures thereof, or other liquid propellants such as dimethyl ether, and from about 70 to 95 percent of the cleaner-polish composition. As an alternative, compressed gases such as carbon dioxide and nitrous oxide may be used for pressure packaging. A wide variety of other packaging techniques also may be used. These features, being well known to those skilled in the art, will not be elaborated on herein.

The following are illustrative examples of the water-in-oil emulsion surface-treating compositions of the present invention.

EXAMPLE I

A silicone-containing cleaner-polish composition was prepared by charging to a mixing vessel, on a weight basis, 0.90% Span 80, 0.05% Tween 80, 0.5% Dichevrol 500, 24.70% Isopar E, 4.0% silicone fluid (having a viscosity of 500 centistokes), 0.3% alpha-olefin/maleic anhydride polymer, and 0.4% perfume. Span 80 is a sorbitan monooleate nonionic surfactant and Tween 80 is a polyethylene oxide sorbitan monooleate nonionic surfactant; both are marketed by ICI Americas, Inc. Dichevrol 500 is a blend of 25% polybutene (molecular weight 950) with 75% $C_{15+}$ branched alkylbenzene, and is marketed by Chevron. Isopar E is an isoparaffinic hydrocarbon solvent, flash point 45° F., marketed by Exxon Corp. The alpha-olefin/maleic anhydride polymer is composed of, on a molar basis, 50% maleic anhydride, 10% 1-octadecene, and 40% mixed $C_{24}$–$C_{28}$ alpha-olefin. The polymer was added in solution with a portion of the hydrocarbon solvent. These ingredients were mixed at room temperature to yield a clear, homogeneous solution. In a separate vessel was charged, on a weight basis, 68.95% water and 0.20% formaldehyde (37% solution). After mixing these ingredients at room temperature to achieve a second homogeneous solution, this later solution was slowly added to the first solution under moderate agitation. The combined solution was mixed for about thirty minutes, then homogenized at 70 psig with an orifice plate. Thereafter the homogenized mixture was charged to an aerosol can at a pressure of 17 to 20 inches of mercury. The aerosol can was then pressure-filled with a hydrocaroon propellant blend containing 83% by weight isobutane and 17% by weight propane. The finished product contained, on a weight basis, 86% of the homogenized mixture and 14% propellant.

Additional exemplary embodiments of the present invention are set forth in Tables I, II, III, IV and V. The examples of Tables I, II, III are silicone-containing compositions and the examples of Tables IV and V are non-drying oil-containing compositions. All the examples were prepared using techniques substantially as described in Example 1. The examples of Tables III and V are all packaged in aerosol spray packages and used 86% of the composition shown in Tables III and V and 14% of a hydrocarbon propellant containing 83% by weight isobutane and 17% by weight propane.

TABLE I

| Ingredients | Example No. | | | |
|---|---|---|---|---|
| | 2 | 3 | 4 | 5 |
| Span 80 | 0.90 | 0.90 | 0.90 | |
| Tween 80 | 0.05 | 0.05 | 0.05 | 0.05 |
| Witconol 14 | | | | 0.90 |
| Polymer A | 0.30 | 0.30 | | 0.30 |
| Polymer B | | | 0.30 | |
| Dichevrol 500 | | | 0.50 | 0.50 |
| Mineral Oil 72 SSU | | 0.50 | | |
| Isopar E | 24.70 | 24.70 | 25.00 | 24.70 |
| Silicone Fluid, 500 CSTK | 4.00 | 4.00 | 4.00 | 4.00 |
| Perfume | | | | 0.40 |
| Water | 69.85 | 69.35 | 69.05 | 68.95 |
| Formaldehyde, 37% | 0.20 | 0.20 | 0.20 | 0.20 |

TABLE I-continued

| Ingredients | Example No. | | | |
|---|---|---|---|---|
| | 2 | 3 | 4 | 5 |
| | 100.00% | 100.00% | 100.00% | 100.00% |

TABLE II

| Ingredients | Example No. | | | |
|---|---|---|---|---|
| | 6 | 7 | 8 | 9 |
| Span 80 | | | 0.90 | 0.90 |
| Tween 80 | 0.05 | 0.05 | 0.05 | 0.05 |
| Monamid 150 ADY | 0.90 | | | |
| Monamid 150 IS | | 0.90 | | |
| Polymer A | 0.30 | 0.30 | 0.60 | 0.30 |
| Dichevrol 500 | 0.50 | 0.50 | 0.50 | 0.50 |
| Isopar E | 24.70 | 24.70 | 24.40 | 1.70 |
| Isopar G | | | | 9.00 |
| Silicone Fluid, 500 CSTK | 4.00 | 4.00 | 4.00 | 2.50 |
| Silicone Fluid 10,000 CSTK | | | | 0.50 |
| Perfume | 0.40 | 0.40 | 0.40 | 0.35 |
| Water | 68.95 | 68.95 | 68.95 | 84.00 |
| Formaldehyde, 37% | 0.20 | 0.20 | 0.20 | 0.20 |
| | 100.00% | 100.00% | 100.00% | 100.00% |

TABLE III

| Ingredients | Example No. | | | |
|---|---|---|---|---|
| | 10 | 11 | 12 | 13 |
| Span 80 | 0.70 | 0.70 | 0.90 | 4.50 |
| Tween 80 | 0.05 | 0.05 | 0.05 | 0.25 |
| Polymer A | 0.30 | | 0.30 | 3.75 |
| Polymer B | | 0.30 | | |
| Dichevrol 100 | 0.50 | 0.50 | | |
| Dichevrol 500 | | | 0.50 | 5.00 |
| Isopar E | 24.70 | 24.70 | 24.70 | 21.25 |
| Silicone Fluid, 100 CSTK | 2.00 | | | |
| Silicone Fluid, 500 CSTK | | 2.00 | 3.00 | 15.00 |
| Silicone Fluid, 1000 CSTK | 2.00 | | | |
| Silicone Fluid 10,000 CSTK | | | 1.00 | |
| Perfume | | | 0.40 | 0.40 |
| Water | 69.55 | 71.55 | 68.95 | 49.65 |
| Formaldehyde 37% | 0.20 | 0.20 | 0.20 | 0.20 |
| | 100.00% | 100.00% | 100.00% | 100.00% |

TABLE IV

| Ingredients | Example No. | | | | |
|---|---|---|---|---|---|
| | 14 | 15 | 16 | 17 | 18 |
| Span 80 | 0.70 | 0.70 | 0.70 | 0.70 | 0.90 |
| Tween 80 | 0.05 | 0.05 | 0.05 | 0.05 | 0.05 |
| Polymer A | | | | | 0.98 |
| Polymer B | | | 1.80 | | |
| Polymer C | 1.80 | | | | |
| Polymer D | | 1.80 | | | |
| Polymer E | | | | 1.80 | |
| Dichevrol 100 | 0.50 | 0.50 | 0.50 | 0.50 | 0.80 |
| Mineral Oil 72 SSU | 9.00 | 9.00 | 9.00 | 9.00 | |
| Mineral Oil 350 SSU | | | | | 19.00 |
| Polybutene 128 | | | | | 1.00 |
| Isopar E | 18.20 | 18.20 | 18.20 | 18.20 | 5.52 |
| Isopar H | | | | | 14.50 |
| Water | 69.55 | 69.55 | 69.55 | 69.55 | 57.05 |
| Formaldehyde, 37% | 0.20 | 0.20 | 0.20 | 0.20 | 0.20 |
| | 100.00% | 100.00% | 100.00% | 100.00% | 100.00% |

TABLE V

| Ingredient | Example No. | | | |
|---|---|---|---|---|
| | 19 | 20 | 21 | 22 |
| Span 80 | 0.70 | 0.70 | 0.70 | 0.70 |
| Tween 80 | 0.05 | 0.05 | 0.05 | 0.05 |
| Terpolymer A | 1.80 | 0.90 | 5.00 | 0.60 |
| Dichevrol 100 | 0.50 | 0.25 | 0.50 | 0.50 |
| Mineral Oil 72 SSU | 9.00 | | 9.00 | |
| Mineral Oil 350 SSU | | 3.00 | | 11.40 |
| Polybutene 128 | | | | 0.60 |
| Isopar E | 18.20 | 17.10 | 18.00 | 3.40 |
| Isopar H | | | | 15.00 |
| Water | 69.55 | 77.80 | 66.55 | 67.55 |
| Formaldehyde, 37% | 0.20 | 0.20 | 0.20 | 0.20 |
| | 100.00% | 100.00% | 100.00% | 100.00% |

KEY TO TABLES I, II, III, IV & V

Span 80 is a sorbitan monooleate nonionic surfactant marketed by ICI Americas, Inc.
Tween 80 is a polyethylene oxide (20) sorbitan monooleate nonionic surfactant marketed by ICI Americas, Inc.
Witconol 14 is a polyglyceryl-4 oleate marketed by Witco Chemical Company.
Monamid 150 ADY is a linoleamide marketed by Mona Industries, Inc.
Monamid 150 IS is an isostearamide marketed by Mona Industries, Inc.
Dichevrol 100 is a $C_{15}+$ branched alkylbenzene marketed by Chevron.
Dichevrol 500 is a blend of 25% polybutene (mol. wgt. 950) with 75% $C_{15}+$ branched alkylbenzene marketed by Chevron.
Isopar E, G, and H are isoparaffinic hydrocarbon solvents, flash points 45° F., 100° F., and 123° F. respectively, marketed by Exxon Corp.
Silicone fluids are dimethylpolysiloxane having the indicated centistoke viscosity.
Polybutene 128 is polybutene (mol. wgt. 2700) marketed by Chevron.
Polymer A is 50 mole % maleic anhydride, 10 mole % 1-octadecene, and 40 mole % mixed $C_{24}$-$C_{28}$ 1-alkene.
Polymer B is 50 mole % maleic anhydride, 25 mole % 1-octadecene, and 25 mole % $C_{30}+$ 1-alkene.
Polymer C is 50 mole % maleic anhydride, 10 mole % 1-octadecene, and 40 mole % mixed $C_{20}$-$C_{24}$ 1-alkene.
Polymer D is 50 mole % maleic anhydride, 25 mole % 1-octene, and 25 mole % 1-octadecene.
Polymer E is 50 mole % maleic anhydride, 40 mole % 1-octadecene, and 10 mole % mixed $C_{24}$-$C_{28}$ 1 alkene.

In the examples various modifications can be made in the formulations within the context of the present disclosure. In the present specification, the invention has been described in relation to embodiments to illustrate the effect of the alpha-olefin/maleic anhydride polymers in the compositions. It will be apparent to those skilled in the art that various modifications can be made in the compositions without departing from the inventive concept as set forth herein.

What is claimed is:

1. A surface-treating, water-in-oil emulsion composition for furniture and similar household items comprising water, organic solvent, film-former, nonionic emulsifier and an alpha-olefin/maleic anhydride polymer selected from the group consisting of: (a) polymers of (a1) maleic anhydride and (a2) at least one 1-alkene having 12–30 carbon atoms; and (b) polymers of (b1) maleic anhydride, (b2) at least one lower 1-alkene and (b3) at least one higher 1-alkene, said lower 1-alkenes having 4–18 carbon atoms and said higher 1-alkenes having more than 18 carbon atoms.

2. The composition of claim 1 wherein the water is present in an amount of about 40 to 85% by weight; the organic solvent is present in an amount of about 5 to 70% by weight; the film-former in an amount of about 0.5 to 30% by weight; the emulsifier in an amount of about 0.2 to 5% by weight and the polymer in an amount of about 0.05 to 5% by weight.

3. A surface-treating, water-in-oil emulsion composition for furniture and similar household items comprising:

from about 0.05 to about 5 percent by weight of an alpha-olefin/maleic anhydride polymer selected from the group consisting of: (a) polymers of (a1) maleic anhydride and (a2) at least one 1-alkene having 12–30 carbon atoms; and (b) polymers of (b1) maleic anhydride, (b2) at least one lower 1-alkene and (b3) at least one higher 1-alkene, said lower 1-alkenes having 4–18 carbon atoms and said higher 1-alkenes having more than 18 carbon atoms;

from about 0.2 to about 5 percent by weight of a nonionic emulsifier;

from about 5 to about 70 percent by weight of a hydrocarbon solvent;

from about 0.5 to about 15 percent by weight of a film-forming silicone compound;

from about 0.05 to about 5 percent by weight of a coupling oil; and from about 60 to 85 percent by weight water.

4. The surface-treating, water-in-oil emulsion composition of claim 3 wherein the composition comprises from about 0.1 to aobut 1.0 percent of said alpha-olefin/maleic anhydride polymer.

5. The surface-treating, water-in-oil emulsion composition of claim 3 wherein the composition comprises from about 0.2 to about 0.4 percent of said alpha-olefin/maleic anhydride polymer.

6. The surface-treating, water-in-oil emulsion composition of claim 3 wherein the composition comprises from about 0.7 to about 1 percent of said nonionic emulsifier.

7. The surface-treating, water-in-oil emulsion composition of claim 3 wherein the composition comprises from about 3 to about 5 percent of said film-forming silicone compound.

8. The composition of claim 2 which further includes from about 0.05 to 5% by weight of a coupling oil.

9. A surface-treating, water-in-oil emulsion composition for furniture and similar household items comprising:

from about 0.1 to about 8 percent by weight of an alpha-olefin/maleic anhydride polymer selected from the group consisting of: (a) polymers of (a1) maleic anhydride and (a2) at least one 1-alkene having 12–30 carbon atoms; and (b) polymers of (b1) maleic anhydride, (b2) at least one lower 1-alkene and (b3) at least one higher 1-alkene, said lower 1-alkenes having 4–18 carbon atoms and said higher 1-alkenes having more than 18 carbon atoms;

from about 0.2 to about 5 percent by weight of a nonionic emulsifier;

from about 5 to about 70 percent by weight of a hydrocarbon solvent;

from about 1 to about 30 percent by weight of a film-forming non-drying oil;

from about 0.05 to about 5 percent by weight of a coupling oil; and from about 40 to 85 percent by weight water.

10. The composition of claim 9 wherein the composition comprises from about 0.3 to about 3 percent of said alpha-olefin/maleic anhydride polymer.

11. The composition of claim 9 wherein the composition comprises from about 0.5 to about 2 percent of said alpha-olefin/maleic anhydride polymer.

12. The composition of claim 9 wherein the composition comprises from about 0.70 to about 1 percent of said nonionic emulsifier.

13. The composition of claim 9 wherein the composition comprises from abut 2 to about 20 percent of said film-forming non-drying oil.

14. The composition of claim 1 wherein said alpha-olefin/maleic anhydride polymer comprises maleic anhydride, at least one of said lower 1-alkene monomers and at least one of said higher 1-alkene monomers.

15. The composition of claim 14 wherein said alpha-olefin/maleic anhydride polymer comprises from about 49 to about 60 mole percent maleic anhydride, from about 10 to about 40 mole percent of one of said lower 1-alkene monomers, and from about 10 to about 40 mole percent of one of said 1-alkene monomers.

16. The composition of claim 14 wherein said alpha-olefin/maleic anhydride polymer comprises from about 49 to about 55 mole percent maleic anhydride, from about 10 to about 30 mole percent of one of said lower 1-alkene monomers, and from about 10 to 40 mole percent of one of said higher 1-alkene monomers.

17. The composition of claim 2 wherein the composition is essentially wax-free, having no more than 0 to about 0.1% wax by weight of the composition.

18. An aerosol composition comprising from about 70 to 95% by weight of the composition of claim 1 and from about 5 to 30% by weight of an aerosol propellant.

* * * * *